(12) United States Patent
Zhang et al.

(10) Patent No.: US 8,850,349 B2
(45) Date of Patent: Sep. 30, 2014

(54) SMART USER-CUSTOMIZED GRAPHICAL KEYBOARD

(75) Inventors: Xincheng Zhang, Sunnyvale, CA (US); Yefei Peng, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/441,489

(22) Filed: Apr. 6, 2012

(65) Prior Publication Data

US 2013/0268879 A1 Oct. 10, 2013

(51) Int. Cl.
*G06F 3/00* (2006.01)
*G06F 9/00* (2006.01)
*G06F 17/00* (2006.01)
*G06F 3/01* (2006.01)

(52) U.S. Cl.
CPC ...................................... *G06F 3/017* (2013.01)
USPC ............................ 715/773; 715/771; 715/764

(58) Field of Classification Search
CPC ... G06F 3/0237; G06F 3/04883; G06F 3/017; G06F 1/1673
USPC .......................................... 715/771, 764, 773
See application file for complete search history.

(56) References Cited

U.S. PATENT DOCUMENTS

| | | | |
|---|---|---|---|
| 2004/0046744 A1 | 3/2004 | Rafii et al. | |
| 2004/0178994 A1 | 9/2004 | Kairls, Jr. | |
| 2010/0103106 A1 | 4/2010 | Chui | |
| 2010/0315266 A1 | 12/2010 | Gunawardana et al. | |
| 2011/0074692 A1 | 3/2011 | Causey et al. | |
| 2012/0144337 A1* | 6/2012 | Archer et al. ................. | 715/773 |

FOREIGN PATENT DOCUMENTS

| | | |
|---|---|---|
| EP | 1457864 A1 | 9/2004 |
| JP | 1153093 A | 2/1999 |

OTHER PUBLICATIONS

Wauters, "Developer 'social keyboard' Android app SwiftKey raises 2.4 million," TechCrunch, http://eu.techcrunch.com/2011/12/07/developer-of-social-keyboard-andro, Dec. 7, 2011, 1 p.
Ridden, "LiquidKeyboard said to make tablet touch-typing a might easier," Mobile Technology, http://www.gizmag.com/liquidkeyboard-said-to-ease-touch-typing-woes-on-tablets/17691, Jan. 26, 2011, 2 pp.
Angus, "LiquidKeyboard™, Bringing touch-typing to touch screens and surfaces," University of Technology, Sidney, http://www.liquidkeyboard.org/, accessed on Jan. 27, 2012, 2 pp.
International Search Report and Written Opinion from International Application No. PCT/US2013/030258, mailed Nov. 29, 2013, 9 pages.

* cited by examiner

*Primary Examiner* — Boris Pesin
*Assistant Examiner* — Sabrina Greene
(74) *Attorney, Agent, or Firm* — Shumaker & Sieffert, P.A.

(57) ABSTRACT

A computing device automatically customizes attributes of a graphical keyboard based on user inputs to the graphical keyboard. For example, the computing device can display a first graphical keyboard arrangement that includes a first representation of a key associated with a target region of an input-sensitive display. The computing device receives a plurality of user inputs, each associated with a respective touch region of the input-sensitive display. Subsequent to determining that one or more of the touch regions is not substantially aligned with the target region, the computing device displays a second graphical keyboard arrangement that includes a second representation of the key, wherein at least one attribute of the second representation of the key is graphically modified relative to the first representation of the key so as to substantially align one or more of the touch regions with a target region associated with the second representation of the key.

21 Claims, 6 Drawing Sheets

SMART USER-CUSTOMIZED GRAPHICAL KEYBOARD

TECHNICAL FIELD

The disclosure relates to graphical keyboards provided by computing devices.

BACKGROUND

A user may interact with applications that are executing on a computing device (e.g., a mobile phone, tablet computer, smart phone, desktop computer, or the like). In some examples, a computing device may include a touch-sensitive display that may enable a user to interact with the computing device. For instance, an application executing on a computing device may cause a touch-sensitive display to display a graphical keyboard that may enable a user to register key presses by touching certain areas of the graphical keyboard.

Individual users of graphical keyboards may have varying typing styles. The graphical keyboard may be smaller in size than a physical keyboard to which a user may be accustomed. In some cases, an individual user may make generally consistent errors when typing on a graphical keyboard. For example, the actual key on the graphical keyboard that is touched by the user may be different from an intended target key.

SUMMARY

In one aspect, a method includes outputting, at an input-sensitive display of a computing device, a first graphical keyboard arrangement including a first representation of a key that is associated with a target region of the input-sensitive display, and receiving a plurality of user inputs at the input-sensitive display, each user input from the plurality of user inputs being associated with a respective touch region of the input-sensitive display. The method also includes, responsive to determining that each input from the plurality of user inputs is associated with the first representation of the key, determining whether one or more of the associated touch regions is not substantially aligned with the target region associated with the first representation of the key. The method also includes identifying a quantity of the touch regions that are not substantially aligned with the target region, and, subsequent to determining that the quantity exceeds a threshold quantity of touch regions that are not substantially aligned with the target region, outputting, at the input-sensitive display, a second graphical keyboard arrangement that includes a second representation of the key, wherein at least one attribute of the second representation of the key is graphically modified relative to the first representation of the key so as to substantially align one or more of the touch regions with a target region associated with the second representation of the key.

In another aspect, a system includes at least one processor, a keyboard application operable by the at least one processor to generate graphical keyboard arrangements, and an input-sensitive display that outputs a first graphical keyboard arrangement including a first representation of a key that is associated with a target region of the input-sensitive display. The input-sensitive display is configured to receive a plurality of user inputs each associated with a respective touch region of the input-sensitive display, wherein the plurality of user inputs are received during use by a user of an application executing on the system other than the keyboard application, and the keyboard application, responsive to determining that each input from the plurality of user inputs is associated with the first representation of the key, determines whether one or more of the associated touch regions is not substantially aligned with the target region associated with the first representation of the key. The input-sensitive display outputs a second graphical keyboard arrangement that includes a second representation of the key, wherein at least one attribute of the second representation of the key is graphically modified relative to the first representation of the key so as to substantially align one or more of the touch regions with a target region associated with the second representation of the key.

In another aspect, a computer-readable storage medium comprising instructions that, if executed by one or more processors of a computing system, cause the computing system to perform operations comprising outputting a first graphical keyboard arrangement for display, the first graphical keyboard arrangement including a first representation of a key that is associated with a target region of an input-sensitive display, receiving data indicative of a plurality of user inputs, each user input from the plurality of user inputs being associated with a respective touch region of the input-sensitive display, and responsive to determining that each input from the plurality of user inputs is associated with the first representation of the key, determining whether one or more of the associated touch regions is not substantially aligned with the target region associated with the first representation of the key. The operations also include, subsequent to determining that one or more of the touch regions is not substantially aligned with the target region associated with the first representation of the key, outputting for display a second graphical keyboard arrangement that includes a second representation of the key, wherein at least one attribute of the second representation of the key is graphically modified relative to the first representation of the key so as to substantially align one or more of the touch regions with a target region associated with the second representation of the key.

The details of one or more examples are set forth in the accompanying drawings and the description below. Other features, objects, and advantages will be apparent from the description and drawings, and from the claims.

DETAILED DESCRIPTION

In general, the disclosure is directed to customizing attributes of a graphical keyboard on a computing device. For example, a computing device can execute or otherwise implement a keyboard application that automatically customizes an arrangement of a graphical keyboard based on data collected from a user's use of the graphical keyboard, and presents the customized graphical keyboard to the user. The graphical keyboard may, for example, be presented on an input-sensitive display of the computing device.

In an example aspect, the keyboard application may present a training program to the user for customizing the graphical keyboard. For example, the training program may be presented to the user upon initial use of a default graphical keyboard of the computing device. According to one example aspect, the training program may present a sample training text to the user by a display, and the user may be instructed to type the training text using the default graphical keyboard. The keyboard application may record instances of mistyping by the user that occur when the user types the training text. The keyboard application may be configured to disregard other types of mistakes, such as misspelled words or displacement of fingers on the keys, which do not result from misdirected key presses.

In another example aspect, in addition to or instead of the training program mode, the keyboard application may operate in a continuous keyboard learning mode. In the continuous keyboard learning mode, the keyboard application executes in the background while the user is using the computing device, and gathers data based on the user's typing associated with other applications of the computing device.

In some aspects, for each key represented on the graphical keyboard, the keyboard application may log the exact locations that the user inputs to the input-sensitive surface, and over time develop a distribution of the locations of touches within an area associated with each key. In some examples, the keyboard application automatically customizes the graphical keyboard based on the data collected from a user's use of the graphical keyboard, and presents the customized the graphical keyboard to the user. The keyboard application may compare the touch regions to a target region, and modify the graphical keyboard (or propose modifications to the user) when, for example, a position associated with a maximum quantity of touches is located outside of an inner touch region for the key, and the quantity of touches exceeds a threshold value. The keyboard application may, for example, modify the shape, size, and relative position of keys on the graphical keyboard.

Customizing the graphical keyboard to the typing habits of an individual user in this manner may help to improve the quality of the user's experience when using the graphical keyboard, such as by reducing an amount of errors and corrections made by the user. The keyboard application may associate the customized graphical keyboard layout with a user login, allowing multiple users of the computing device to each have a different customized graphical keyboard.

Figure 1:
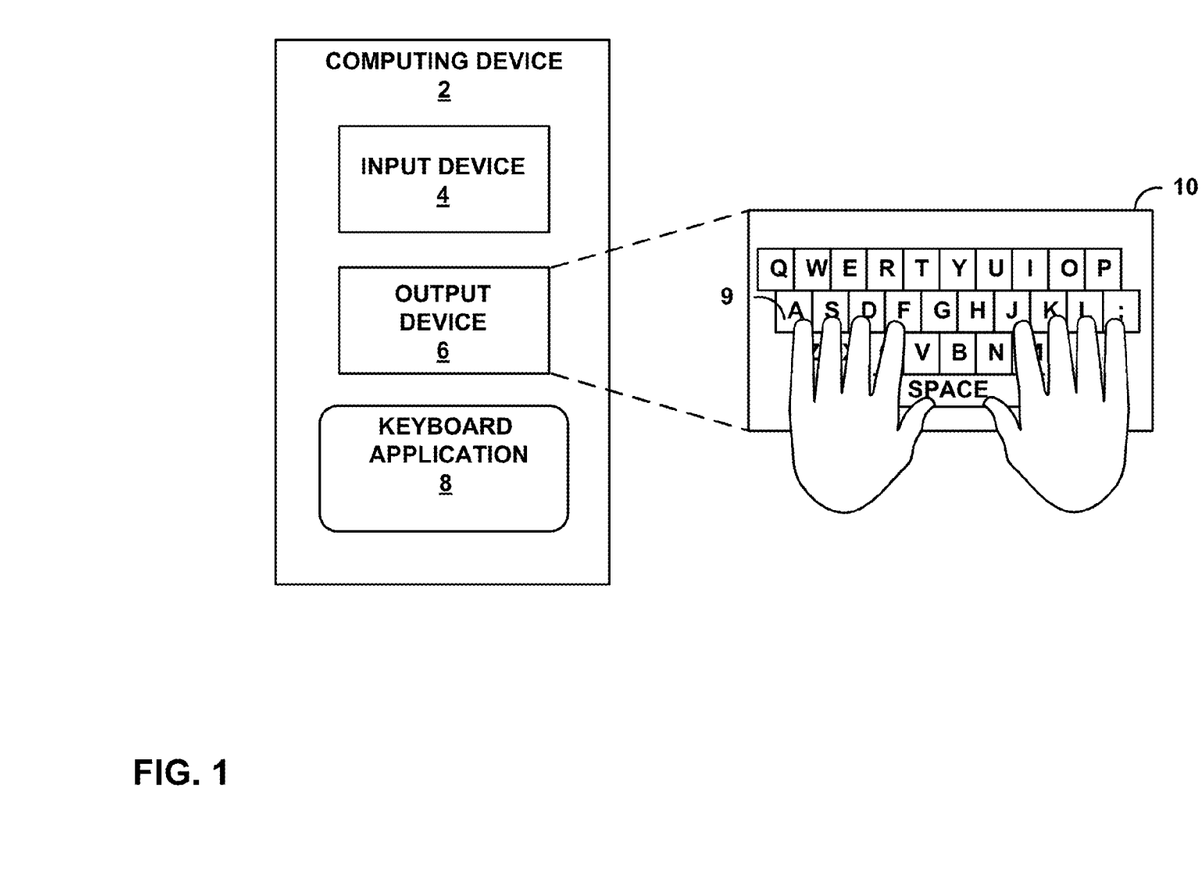
FIG. 1 is a conceptual diagram illustrating an example of a computing device that is configured to execute a keyboard application.

FIG. 1 is a conceptual diagram illustrating an example of a computing device that is configured to execute a keyboard application. As illustrated in FIG. 1, computing device 2 can include input device 4 and output device 6. Computing device 2 may be configured to execute keyboard application 8, which may cause output device 6 to display graphical keyboard 10. Keyboard application 8 may be operable by at least one processor of a computing system including computing device 2 to generate graphical keyboard arrangements. Examples of computing device 2 can include, but are not limited to, portable or mobile devices such as cellular phones, tablet computers, personal digital assistance (PDAs), portable gaming devices, portable media players, and e-book readers, as well as non-portable devices such as desktop computers.

Input device 4, in some examples, is configured to receive input from a user through tactile, audio, or video feedback. Examples of input device 4 can include an input-sensitive display, such as a touch-sensitive and/or a presence-sensitive screen, mouse, keyboard, voice responsive system, or any other type of device for detecting a command from a user. In some examples, input device 4 can include a touch-sensitive display, mouse, keyboard, microphone, or video camera.

Output device 6, in certain examples, may be configured to provide output to a user using tactile, audio, or video stimuli. Output device 6, in one example, includes an input-sensitive display (e.g., touch-sensitive display or presence-sensitive display), a sound card, a video graphics adapter card, or any other type of device for converting a signal into an appropriate form understandable to humans or machines. Additional examples of output device 6 can include a speaker, a cathode ray tube (CRT) monitor, a liquid crystal display (LCD), an organic light emitting diode (OLED), or any other type of device that can generate intelligible output to a user. Output device 6 may present the content of computing device 2 to a user. For example, output device 6 may present a web browser, or other output that may need to be presented to a user. In some examples, output device 6 may be a touch screen that can allow a user to provide one or more user inputs to interact with computing device 2.

Keyboard application 8, executing on computing device 2, may provide one or more signals to cause output device 6 (e.g., a touch-sensitive display) to display graphical keyboard 10. In some examples, a user may provide a user input to cause computing device 2 to select one or more character keys of graphical keyboard 10 by touching the area of output device 6 that displays the character key of graphical keyboard 10. For instance, a user may perform a tap gesture at a displayed character key of graphical keyboard 10, such as character key 9. The tap gesture can include touching a displayed character key and releasing the character key.

In some examples, as when output device 6 includes a presence-sensitive display, touching output device 6 may be accomplished by bringing an input device such as a finger, a stylus, a pen, and the like, within proximity of output device that is sufficiently close to enable output device 6 to detect the presence of the input device. As such, touching a displayed character key of graphical keyboard 10 may, in some examples, not include actual physical contact between an input device and graphical keyboard 10. Similarly, in certain examples, as when output device 6 includes a presence-sensitive display, releasing a displayed character key of graphical keyboard 10 may be accomplished by removing the input device from the detectable range of output device 6.

In an example aspect, keyboard application 8 may present a training program to the user for customizing graphical keyboard 10. For example, the training program may be presented to the user upon initial use of a default graphical keyboard of the computing device 2. According to one example aspect, the training program may present a sample training text to the user by a display (e.g., presented by output device 6), and the user may be prompted to type a predefined series of characters using the default graphical keyboard arrangement. The sample training text presented by the training program of keyboard application 8 can include a variety of characters, and may be selected such that each character appears multiple times and such that the order of the characters varies.

Keyboard application 8 may record instances of mistyping by the user that occur when the user types the training text. For example, keyboard application 8 may register key presses on the touch-sensitive display, and determine when a touch region associated with the key presses is not substantially aligned with a target region of the touch-sensitive display associated with a target key. Keyboard application 8 may determine what target region for a key the user input is associated with based on comparison of an order of the user inputs with an order of the predefined series of characters presented by the training program. Keyboard application 8 may determine whether certain mistakes are due to the user missing an intended target key and pressing a nearby area of graphical keyboard 10 instead. Keyboard application 8 may be configured to disregard other types of mistakes, such as misspelled words, that do not result from misdirected key presses.

In some aspects, for each key represented on graphical keyboard 10, keyboard application 8 may record the exact locations that the user touches on the touch-sensitive surface, and over time develop a distribution of the locations of touches within an area associated with each key. In one example aspect, when a maximum point of the location distribution is located outside of a particular inner region associated with a key, and the value of the maximum point is greater than a threshold, keyboard application 8 may propose to move a boundary of the key to better align with a location of the maximum point, i.e., where the user actually presses the key. For example, keyboard application 8 may move the key boundary for a given key when the maximum point of the location distribution exceeds the threshold and is located at least a certain distance away from a current center area associated with the key. Keyboard application 8 may, for example, modify attributes of graphical keyboard 10, such as the shape, size, and relative position of keys on graphical keyboard 10.

In another example aspect, in addition to or instead of the training program mode, keyboard application 8 may operate in a continuous keyboard learning mode. In the continuous keyboard learning mode, keyboard application 8 executes in the background while the user is using computing device 2, and gathers data based on the user's typing associated with other applications (not shown) of computing device 2. Keyboard application 8 may gather key touch location distribution data, as described above. As another example, keyboard application 8 may learn where the user may makes typing mistakes, such as based on instances in which the user goes back and corrects their typing.

Keyboard application 8 may, for example, occasionally present a display to the user that shows a new proposed graphical keyboard layout, allowing the user to elect to use the new graphical keyboard layout or stay with the current layout. Keyboard application 8 can output a previous graphical keyboard arrangement and the new graphical keyboard at the same time, so that the user can see the proposed changes and select the desired arrangement. Keyboard application 8 can solicit a user selection of one of the first graphical keyboard arrangement and the second graphical keyboard for future use. The new graphical keyboard arrangement may have a different overall size and shape than the first graphical keyboard arrangement, where the overall size and shape of the second graphical keyboard arrangement is selected by keyboard application 8 so as to substantially align one or more of the touch regions with a target region associated with a second representation of a key. Keyboard application 8 may also provide the user the option to accept, reject, or modify the key layout changes on a key-by-key basis, such as by soliciting a user selection of one or more modifications of attributes of one or more representations of keys of the first graphical keyboard arrangement for future use. For example, the user can be given options to modify the proposed layout by moving a key or by resizing the keyboard. In some examples, keyboard application 8 may automatically change the layout of graphical keyboard 10 without requesting user approval. In this manner, techniques of this disclosure may enable the computing device to provide the user with a customized graphical keyboard that is tailored to the particular typing style of the user.

Keyboard application 8 may associate the customized graphical keyboard layout with a user login, allowing multiple users of the computing device to each use a different customized graphical keyboard. The user may be able to turn off the continuous keyboard learning mode, such as by selecting an option indicated on the display to cease execution of the keyboard customization application as a background task. Keyboard application 8 may be, for example, a downloadable or pre-installed application executing on computing device 2. In another example, keyboard application 8 may be part of a hardware unit of computing device.

Figure 2:
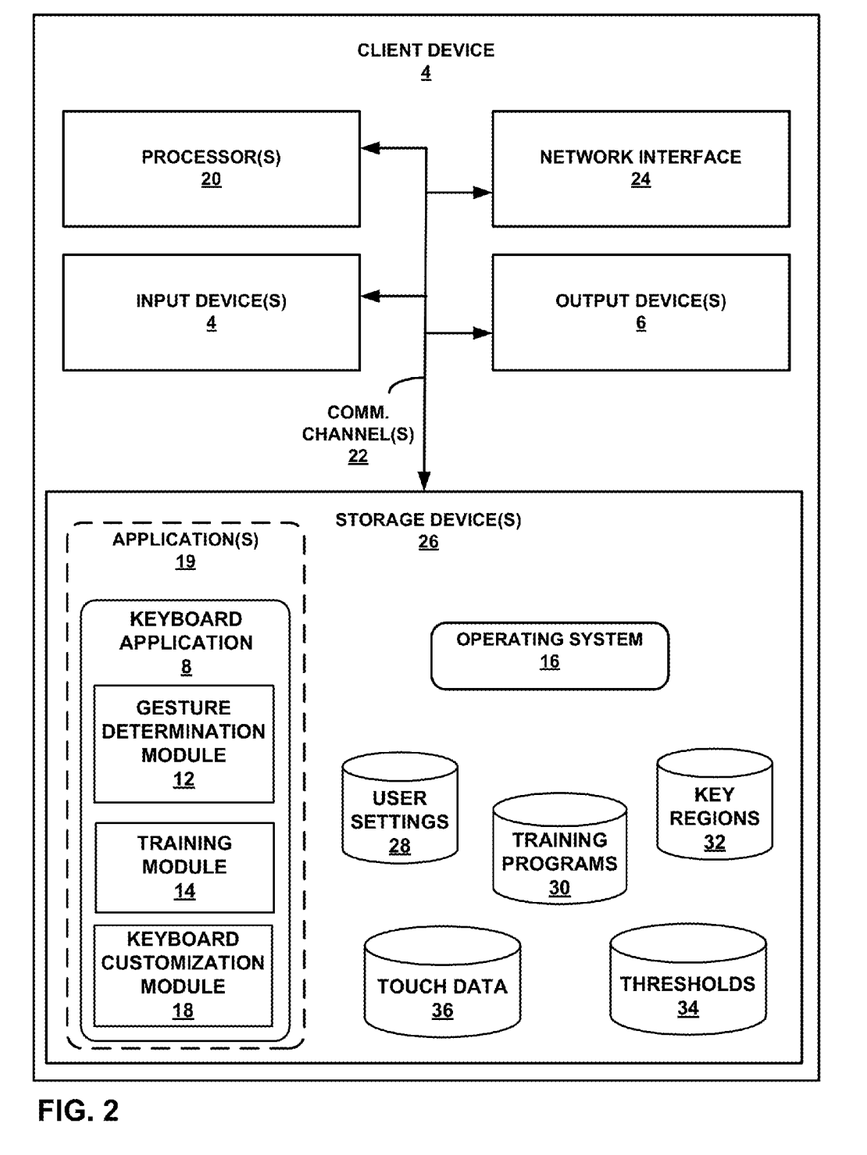
FIG. 2 is a block diagram illustrating further details of one example of the computing device shown in FIG. 1.

FIG. 2 is a block diagram illustrating further details of one example of the computing device shown in FIG. 1. FIG. 2 illustrates only one particular example of computing device 2, and many other example embodiments of computing device 2 may be used in other instances. As shown in the specific example of FIG. 2, computing device 2 includes input device 4, output device 6, one or more applications 19, one or more processors 20, one or more storage devices 26, and network interface 24. Computing device 2 also includes operating system 16, which may include modules that are executable by computing device 2. Computing device 2, in one example, further includes keyboard application 8 that is also executable by computing device 2. Keyboard application 8 includes gesture determination module 12, training module 14, and keyboard customization module 18. Each of components 4, 6, 8, 12, 14, 18, 20, 24, and 26 may be interconnected (physically, communicatively, and/or operatively) for inter-component communications. In some examples, communication channels 22 may include a system bus, network connection, inter-process communication data structure, or any other channel for communicating data. As one example in FIG. 2, components 4, 6, 20, 24 and 26 may be coupled by one or more communication channels 22.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For instance computing device 2 may not, in all examples, include network interface 24.

Although shown as separate components in FIG. 2, in some examples, one or more of keyboard application 8, gesture determination module 12, training module 14, and keyboard customization module 18 may be part of the same module. In some examples, one or more of keyboard application 8, gesture determination module 12, training module 14, and keyboard customization module 18, and one or more processors 20 may be formed in a common hardware unit. In certain examples, one or more of keyboard application 8, gesture determination module 12, training module 14, and keyboard customization module 18 may be software and/or firmware units that are executed on or operable by one or more processors 20.

One or more processors 20 may include, in certain examples, any one or more of a microprocessor, a controller, a digital signal processor (DSP), an application specific integrated circuit (ASIC), a field-programmable gate array (FPGA), or equivalent discrete or integrated logic circuitry. One or more processors 20 may be configured to implement functionality and/or process instructions for execution within computing device 2. For example, one or more processors 20 may be capable of processing instructions stored in one or more storage devices 26.

One or more storage devices 26, in one example, are configured to store information within computing device 2 during operation. Storage device 26, in some examples, is described as a computer-readable storage medium. In some examples, storage device 46 is a temporary memory, meaning that a primary purpose of storage device 46 is not long-term storage. Storage device 46, in some examples, is described as a volatile memory, meaning that storage device 46 does not maintain stored contents when the computer is turned off. Examples of volatile memories include random access memories (RAM), dynamic random access memories (DRAM), static random access memories (SRAM), and other forms of volatile memories known in the art. In some examples, storage device 46 is used to store program instructions for execution by one or more processors 20. Storage device 26, in one example, is used by software or applications running on computing device 2 (e.g., keyboard application 8) to temporarily store information during program execution.

One or more storage devices 26, in some examples, also include one or more computer-readable storage media. One or more storage devices 26 may be configured to store larger amounts of information than volatile memory. One or more storage devices 26 may further be configured for long-term storage of information. In some examples, one or more storage devices 26 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As shown in FIG. 2, storage devices 26 include user settings 28, training programs 30, key regions 32, thresholds 34, and touch data 36. User settings 28, training programs 30, key regions 32, thresholds 34, and touch data 36 may each be configured as a database, flat file, table, tree, or other data structure stored within storage devices 26 of computing device 2. In some examples, user settings 28, training programs 30, key regions 32, thresholds 34, and touch data 36 may be configured as separate data repositories while, in other examples, they may be a part of a single data repository.

In the example of FIG. 2, computing device 2 includes network interface 24. Computing device 2, in one example, uses network interface 24 to communicate with external devices via one or more networks, such as one or more wireless networks. Network interface 24 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 uses network interface 24 to wirelessly communicate with an external device (not shown) such as a server, mobile phone, or other networked computing device.

Computing device 2 may include operating system 16. Operating system 16, in some examples, controls the operation of components of computing device 2. For example, operating system 16, in one example, facilitates the interaction of keyboard application 8 with processors 20, network interface 24, storage device 26, input device 4, and output 6.

Computing device 2 includes keyboard application 8, executable by computing device 2, such as by one or more processors 20. As shown in FIG. 2, keyboard application 8 may include gesture determination module 12, training module 14, and keyboard customization module 18. Applications 19, which include keyboard application 8, may each include program instructions and/or data that are executable by computing device 2. For example, gesture determination module 12, training module 14, and keyboard customization module 18 may include instructions that cause keyboard application 8 executing on computing device 2 to perform one or more of the operations and actions described in the present disclosure. Gesture determination module 12 may receive one or more inputs, such as from input device 4 or output device 6 (e.g., a touch sensitive display), and may determine that the one or more inputs comprise a gesture. Examples of gestures can include, but are not limited to, tap gestures, sliding gestures, circular gestures, and the like.

As one example, keyboard application 8, executing on one or more processors 20, may cause a touch-sensitive display of computing device 2, such as output device 6, to display a graphical keyboard. Gesture determination module 12 may receive an input from output device 6 indicating that a displayed character of the graphical keyboard has been touched, such as by a finger, stylus, pen, or the like. Gesture determination module 12 may determine that a tap gesture has been performed when the selected character has been released. As another example, after receiving an input from output device 6 indicating that a displayed character has been touched, gesture determination module 12 may determine that a sliding gesture has been performed when the selected character is released by sliding the input device off the selected character while maintaining contact with output device 6.

In some example aspects, computing device 2 may operate according to a training program mode. In the training program mode, training module 14 may execute a training program of training programs 30 to provide a block of training text to output device 6 for display to the user. Training module 14 may, for example, run a training program 30 upon initial use of the graphical keyboard by a user of computing device 2. Training programs 30 can include a variety of sample training texts. The training texts may provide a series of characters, including letters, numbers, and other symbols that correspond to characters on graphical keyboard 10. The training texts may be selected to ensure that each character occurs at least once, or multiple times. The training texts may be selected to include common words, common character combinations, and/or a variety of different character combinations, for example.

Gesture determination module 12 registers key presses on the touch-sensitive display by the user, and may determine a touch region associated with each key press. Gesture determination module 12 may determine a touch region associated with a portion of a touch-sensitive display (e.g., output device 6) that is in contact with an input unit, such as a finger, stylus, or other input unit. In some examples, output device 6 may indicate a radius of a contact area between the input unit and output device 6. For instance, the contact area may be an area of the touch-sensitive display where a detected capacitance of the touch-sensitive display changes responsive to a surface area of the input unit (e.g., a finger). In such examples, gesture determination module 12 may determine the touch region of the portion of output device 6 that is in contact with the input unit using the radius indicated by output device 6. In certain examples, output device 6 may indicate a number of pixels or other units of known area of output device 6 that are in contact with the input unit. Gesture determination module 12 may determine a center of the portion of output device 6 that is in contact with the input unit, such as by extrapolating based on the number of units of known area.

In some examples, gesture determination module 12 may indicate that multiple gestures are being performed at once. For instance, a user may provide user inputs that include touching and releasing multiple displayed characters at the same time. In such examples, gesture determination module 12 may track the multiple gestures individually, and keyboard customization module 18 may make a determination for each individual gesture.

Keyboard customization module 18 determines that each user input is associated with a key, i.e., that the user input is intended for contact with a representation of the key on the graphical keyboard. As described in further detail below, keyboard customization module 18 may compare the touch regions with expected target regions associated with the representation of the key on the display, to determine whether a given touch region and the associated target region are substantially aligned.

In the example of a training program mode, keyboard customization module 18 obtains the expected target regions from training module 14 and key regions 32. Key regions 32 may store data specifying boundaries of the target regions on the graphical keyboard. Keyboard customization module 18 can determine which key the user was supposed to press, and obtains a key boundary of this key from key regions 32. For example, an expected order of key characters of the training text may be known by keyboard customization module 18 from training module 14, and keyboard customization module 18 can compare this with an order and identity of user inputs registered by gesture determination module 12. Keyboard customization module 18 is configured to identify extraneous typing mistakes that are unrelated to misdirected key presses, such as spelling errors or displaced fingers. For example, keyboard customization module 18 may note that a misdirected key press may be located very close to an intended key, while a key press associated with a spelling error may be located farther from an intended key. As another example, keyboard customization module 18 may recognize and correct for errors due to displacement of the user's fingers on the graphical keyboard, such as may occur when the user's fingers have drifted slightly from the original positioning without the user's knowledge. Keyboard customization module 18 may ignore the extraneous typing mistakes or finger displacement when comparing touch regions with expected target regions of the graphical keyboard.

In some example aspects, keyboard customization module 18 of computing device 2 may operate in a continuous learning mode for determining whether modifications to a graphical keyboard might be proposed for a user. Computing device 2 may operate according to the continuous learning mode alternatively or additionally to a training program mode such as that described above. In the continuous learning mode, keyboard customization module 18 may execute as a background task while the user makes use of computing device 2. For example, a user may make use of one or more other application(s) 19 executing on operating system 16 of computing device 2, where the other applications 19 are applications other than keyboard application 8. Keyboard customization module 18 may gather data based on the user's inputs to computing device 2 using graphical keyboard 10, and may, for example, store the gathered data at touch data 36 of storage device(s) 26. As one example, while a user types using graphical keyboard 10 using an email application of applications 19, keyboard customization module 18 may operate in the continuous learning mode to record data associated with user inputs during use of the email application and calculate touch regions associated with the user inputs.

Keyboard customization module 18 may identify a target region associated with each touch region. In other words, for each user input, keyboard customization module 18 may identify which key was intended to be pressed by the user input, and then identifies a corresponding target region for the key intended to be pressed. For example, a target region may coincide with a boundary of the representation of the intended key. Keyboard customization module 18 may identify which key was intended to be pressed by the user input, and thus the corresponding target regions, based on user typing self-corrections, such as when a user deletes and retypes some text, selection of an auto-correct suggestion, and/or other user typing corrections, for example. That is, keyboard customization module 18 may identify what key character(s) the user has selected to replace what was originally typed by the user.

Keyboard customization module 18 may determine whether a touch region corresponding to a given user input is substantially aligned with an associated target region of the graphical keyboard, and keyboard customization module 18 identifies instances in which the touch regions do not substantially align with the corresponding expected key region 32. For example, keyboard customization module 18 may compare a center of a touch region to a center of a corresponding target region. Keyboard customization module 18 may determine that the touch region substantially aligns with the corresponding target region when, for example, the centers of the touch region and the target region are within a certain configured distance from one another. In some examples, even though some or all of a touch region lies within a boundary of the representation of the key, if a center of the touch region is too close to an edge of the key boundary, it may be determined not to be substantially aligned. In some example aspects, keyboard customization module 18 may build a cumulative record of user touches in touch data 36 for each user, and may determine whether a distribution of the cumulative user touches is substantially aligned with the target region. In other examples, keyboard customization module 18 may determine that the touch region does not substantially align with the corresponding target region when greater than a threshold quantity of surface area of the touch region is positioned outside of the target region.

Based on user touch data 36 and/or thresholds 34, keyboard customization module 18 may determine that one or more parameters of graphical keyboard could be modified to improve the user experience. Keyboard customization module 18 may, for example, propose to modify one or more attributes such as a shape, size, and relative position of keys on the graphical keyboard. As another example, keyboard customization module 18 may propose to modify an attribute such as an overall layout of the graphical keyboard, including modifying the size of the entire graphical keyboard. For example, keyboard customization module 18 may increase an overall size of the graphical keyboard, such as by increasing a size of one or more keys of the graphical keyboard.

When keyboard customization module 18 determines that one or more parameters of the graphical keyboard should be modified, keyboard customization module 18 may suggest proposed modifications to the graphical keyboard to the user, such as by showing proposed modifications on a display of output device 6. Keyboard customization module 18 may, for example, occasionally present a display to the user that shows a new proposed graphical keyboard layout. Keyboard customization module 18 may simultaneously display both a current layout of the graphical keyboard and a proposed modified layout of the graphical keyboard on a single display.

In some examples, keyboard customization module 18 may give the user an option to elect to use the new graphical keyboard layout or stay with the current layout. Keyboard customization module 18 may also provide the user an option to accept the key layout changes on a key-by-key basis. In some examples, keyboard customization module 18 may automatically change the layout of the graphical keyboard without requesting user approval. The user may be able to turn the continuous keyboard learning mode on or off, e.g., via a user menu presented by computing device 2. The user may also be able to defer participation in a keyboard customization training program.

When multiple different users make use of computing device 2 and have, for example, different user names and associated profiles on computing device 2, training module 14 may run one or more training programs 30 for each user. Keyboard customization module 18 may create different customized graphical keyboards for each user. Keyboard customization module 18 may store data associated with the different customized graphical keyboards to user settings 28. For example, keyboard customization module 18 may store data to user settings 28 indicating the mapping between users and respective customized graphical keyboard layouts. User settings 28 can include a variety of user settings for each user, in addition to settings related to the customized graphical keyboards.

In one example, keyboard customization module 18 may suggest enlarging an overall size of the graphical keyboard 10 based on comparisons of touch regions and target regions. For example, if touch data 36 collected based on the user's typing indicates that the user often touches locations beyond a boundary of the current graphical keyboard, then keyboard customization module 18 may propose to enlarge the overall size of the graphical keyboard 10.

Figure 3:
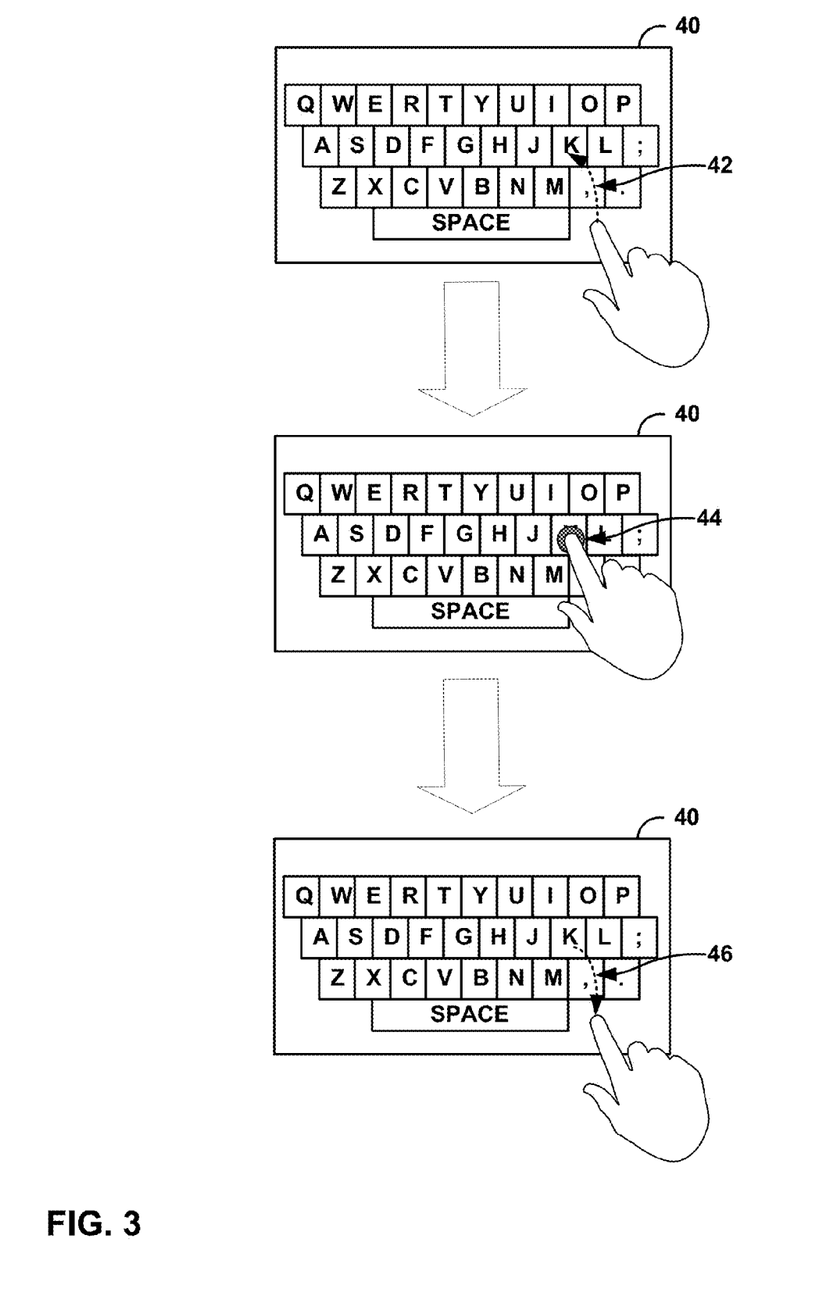
FIG. 3 is a conceptual diagram illustrating an example of a keyboard application.

FIG. 3 is a conceptual diagram illustrating an example of a keyboard application. For purposes of illustration, the example keyboard application is described below in the context of computing device 2 of FIG. 1 and FIG. 2. Keyboard application 8, executing on one or more processors 20, may provide one or more signals to cause a touch-sensitive display, such as output device 6, to display graphical keyboard 40. As illustrated in FIG. 3, a user may perform a gesture, such as a tap gesture, at a location of the touch-sensitive display (e.g., output device 6) that displays one or more of the characters of the graphical keyboard. A tap gesture may be defined as touching the touch-sensitive display at one or more of the displayed characters with an input unit (a finger, in the illustrated example) and releasing the character by removing the input unit from the touch-sensitive display. In certain examples, a user may perform a sliding gesture (not illustrated), such as by releasing the character by removing the input unit from the selected character while maintaining contact between the input unit and the touch-sensitive display.

In the illustrated example of FIG. 3, a tap gesture begins with gesture 42, where a user begins to initiate touching graphical keyboard 40 at the displayed character "k". At gesture 44, the user has made contact with the displayed letter "k" of graphical keyboard 40. Gesture determination module 12 may determine that a gesture, such as the illustrated tap gesture, has begun when output device 6 provides one or more signals indicating that an input device has made contact with the touch-sensitive display. In certain examples, as when output device 6 includes a presence-sensitive display, gesture determination module 12 may determine that a gesture has begun when output device 6 provides one or more signals indicating that an input device has come into a detectable range of the presence-sensitive device.

At gesture 46, a user has released the displayed character "k" by removing his or her finger from the touch-sensitive display. Gesture determination module 12 may determine that a tap gesture has been performed because the input unit (a finger in the illustrated example) was removed from the selected character by removing the input unit from the touch-sensitive display.

Upon determining that a tap gesture has been performed, gesture determination module 12 may determine the touch region of the portion of output device 6 that is in contact with the input unit, such as by using position data and a radius of a touch region indicated by output device 6. Gesture determination module 12 may store user touch data, such as the position of a tap gesture on the graphical keyboard, a key character associated with the position, and a radius of the touch region associated with the tap gesture, to touch data 36.

Figure 4A:
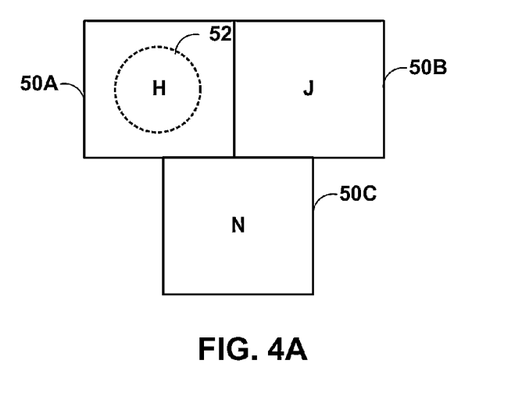
FIGS. 4A-4D are block diagrams illustrating example portions of a graphical keyboard.

FIGS. 4A-4D are block diagrams illustrating example portions of a graphical keyboard. FIG. 4A includes three target regions 50A-50C ("target regions 50"). In the example of FIG. 4A, target region 50A is associated with a representation of the "H" key, target region 50B is associated with a representation of the "J" key, and target region 50C is associated with a representation of the "N" key. FIG. 4A also includes a touch region 52 associated with the representation of the key "H." In this example, target regions 50 are co-extensive with outer boundaries of a representation of the respective keys on the graphical keyboard. In other examples, target regions 50 may not be co-extensive with the outer boundaries of the representations of the keys. For example, a target region 50 may consist of a different region associated with the respective key, such as by delineating an inner region of a representation of a key.

Figure 5:
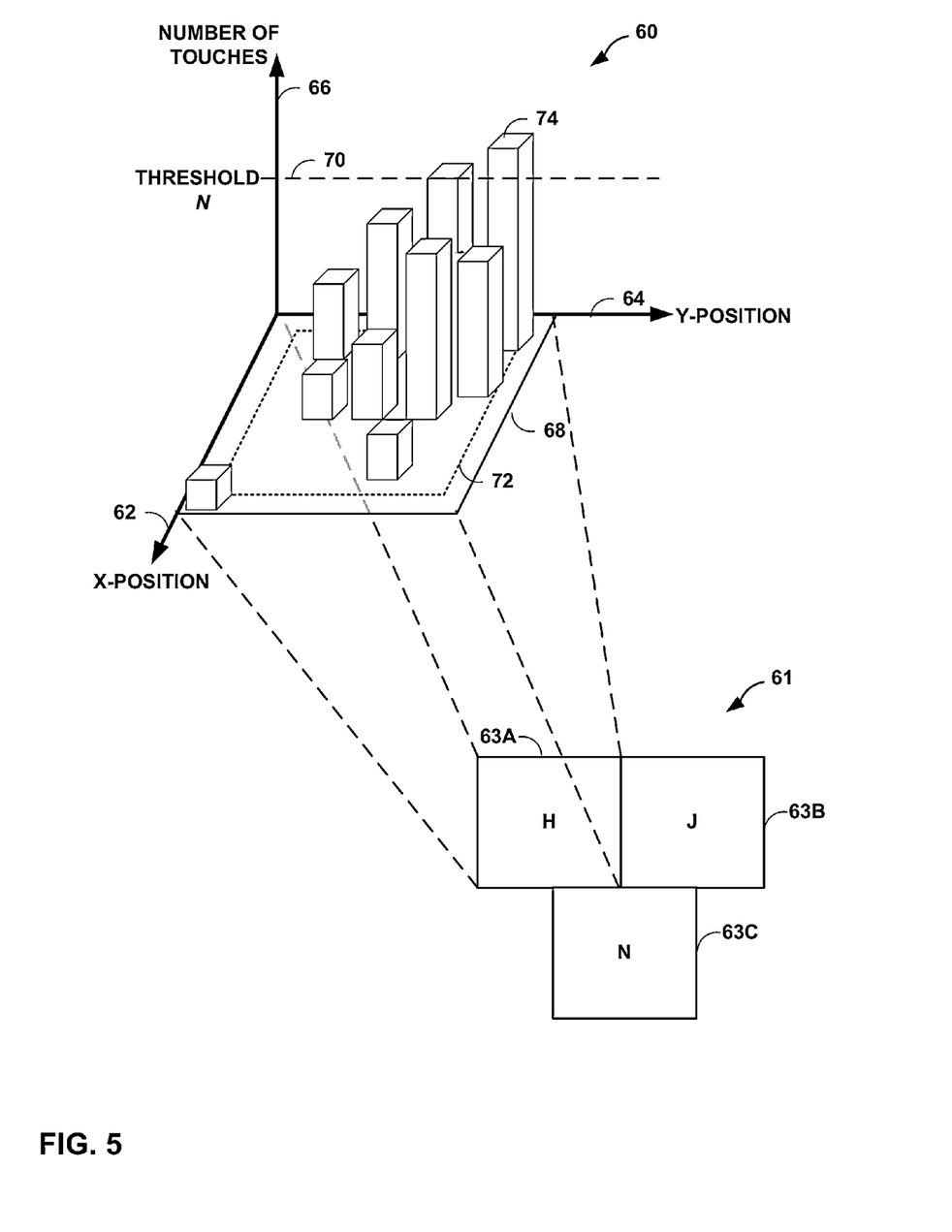
FIG. 5 is a conceptual diagram illustrating an example distribution of user inputs associated with a representation of a key on a graphical keyboard.

In some aspects, touch region 52 may be determined by gesture determination module 12 based on a single user input, or may be determined by keyboard customization module 18 based on multiple user inputs, such as based on a set of user inputs like those represented by the distribution of graph 60 of FIG. 5. In an example in which a target region 50 corresponds to a single user input, keyboard customization module 18 may determine that the touch region 52 is associated with target region 50A, in the sense that keyboard customization module 18 determines that a user is expected to have typed "H" when the user input associated with touch region 52 occurred. Keyboard customization module 18 may determine the association based on data from a training program 30, or other method.

Figure 4B:
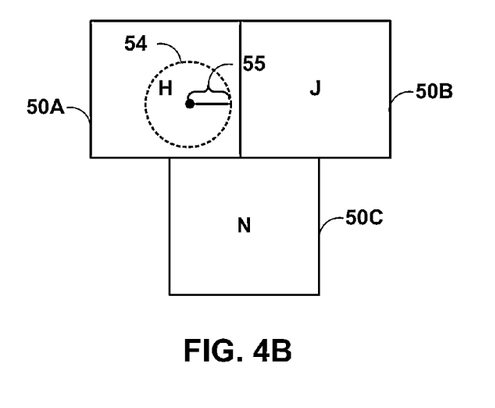

In the example of FIG. 4A, keyboard customization module 18 may determine that touch region 52 is substantially aligned with target region 50A. For example, keyboard customization module 18 may determine that a center of target region 52 is within a threshold distance of a center of target region 50A. In the example of FIG. 4B, keyboard customization module 18 may likewise determine that touch region 54 is associated with target region 50A. Gesture determination module 12 may compute a radius 55 of touch region 54, and may use the radius 55 to determine the touch region 54.

Figure 4C:
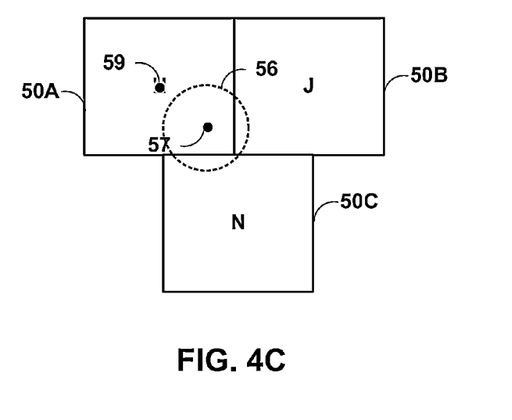
Figure 4D:
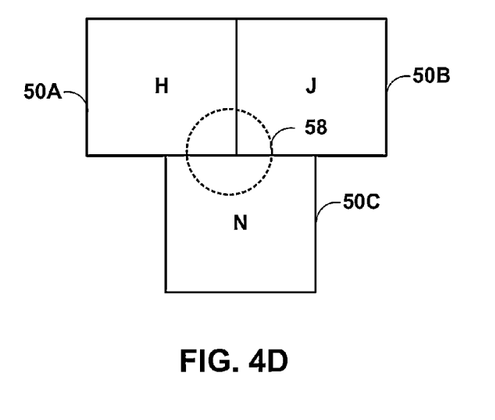

Keyboard customization module 18 may determine that the touch region substantially aligns with the corresponding target region when, for example, the centers of the touch region and the target region are within a certain configured distance from one another. In some examples, even though some or all of a touch region lies within a boundary of the representation of the key, if a center of the touch region is too close to an edge of the key boundary, keyboard customization module 18 may determine that the touch region is not substantially aligned with the target region. FIG. 4C illustrates one such example. In the example of FIG. 4C, keyboard customization module 18 may determine that touch region 56 is not substantially aligned with target region 50A because a center 57 of touch region 56 is greater than a threshold distance away from a center 59 of the target region 50A. FIG. 4D may be another example in which a touch region 58 is found not to be substantially aligned with a target region 50A associated with the representation of the key corresponding to the character of "H."

FIG. 5 is a conceptual diagram illustrating an example distribution of user inputs associated with a representation of a key on a graphical keyboard. FIG. 5 illustrates a portion 61 of a graphical keyboard that includes representations keys 63A-63C. Key 63A is a representation of the "H" key, key 63B is associated with a representation of the "J" key, and key 63C is associated with a representation of the "N" key. In the example of FIG. 5, three-dimensional graph 60 includes an x-axis 62 that represents a position along a first dimension in the plane of the graphical keyboard 10, and a y-axis 64 that represents a position along a second dimension in the plane of the graphical keyboard 10. Three-dimensional graph 60 further includes a z-axis 66 that represents a cumulative quantity N of touches that have occurred at a given position of a key on the graphical keyboard. Keyboard customization module 18 may maintain distribution data 36, which may include data such as that represented by three-dimensional graph 60 for each key represented on the graphical keyboard for each user (e.g., the key associated with the letter "H").

The example of FIG. 5 includes a key boundary 68 that indicates a position on the graphical keyboard associated with a particular key, for example, the key associated with the letter "H." FIG. 5 also includes a target region 72 associated with the representation of the key "H." In the example of FIG. 5, target region 72 is not coextensive with the key boundary 68, but represents an inner region having less surface area than a region encompassed by key boundary 68.

When a user touch is registered by gesture determination module 12 as being associated with a particular (x, y) position in the plane of the graphical keyboard 10, keyboard customization module 18 may log record the instance of the touch, such as by incrementing a counter associated with that (x, y) position. A cumulative quantity of touches up to a given point of time at each (x, y) position within the key boundary for the key "H" is illustrated by three-dimensional graph 60. Keyboard customization module 18 may not record those touches that are determined to be actual typing errors (e.g., spelling mistakes), but instead may only record those touches that are determined to be attempts to type at the representation of the key for "H."

Computing device 2 may be configured with a threshold 70 that specifies a threshold quantity of touches. If the (x, y) position within key boundary 68 that is most touched by the user when the user is attempting to touch the key for "H" is too close to an edge of key boundary 68, then keyboard customization module 18 may determine to modify the location, shape, or other parameter or characteristic of the key to better suit the typing habits of the user.

Keyboard customization module 18 may initiate modification of one or more parameters of the graphical keyboard upon determining that a touch region associated with the key "H" is not substantially aligned with the target region 72 associated with the key "H." For example, keyboard customization module 18 may initiate modification of the graphical keyboard when a most touched position associated with the key "H" is located outside of a configured inner region 72 of the key. The most touched position is represented by a maximum 74 of the distribution represented in three-dimensional graph 60. In some aspects, keyboard customization module 18 may be configured not to modify the graphical keyboard when only a few touches have occurred outside the inner region 72, but may instead modify the graphical keyboard only when the quantity of touches at a position outside the target region 72 exceeds a threshold quantity of touches 70. Sensitivity of keyboard customization module 18 may be configured by adjusting settings for threshold 70 and/or target region 72.

Alternatively or additionally, as described above, keyboard customization module 18 may initiate modification of the graphical keyboard when a center of a touch region is located greater than a configured distance from a center of the target region 72, where the touch region may be determined based on cumulative user inputs represented by graph 60. Keyboard customization module 18 may user other techniques for determining whether a touch region is substantially aligned with the corresponding target region. In response to determining that a touch region is not substantially aligned with the corresponding target region, keyboard customization module 18 may propose to modify the location, shape, or other parameter or characteristic of the key to better suit the typing habits of the user. In this manner, keyboard customization module 18 may help to improve the quality of the user's experience when using the graphical keyboard, such as by reducing an amount of errors and corrections made by the user.

Figure 6:
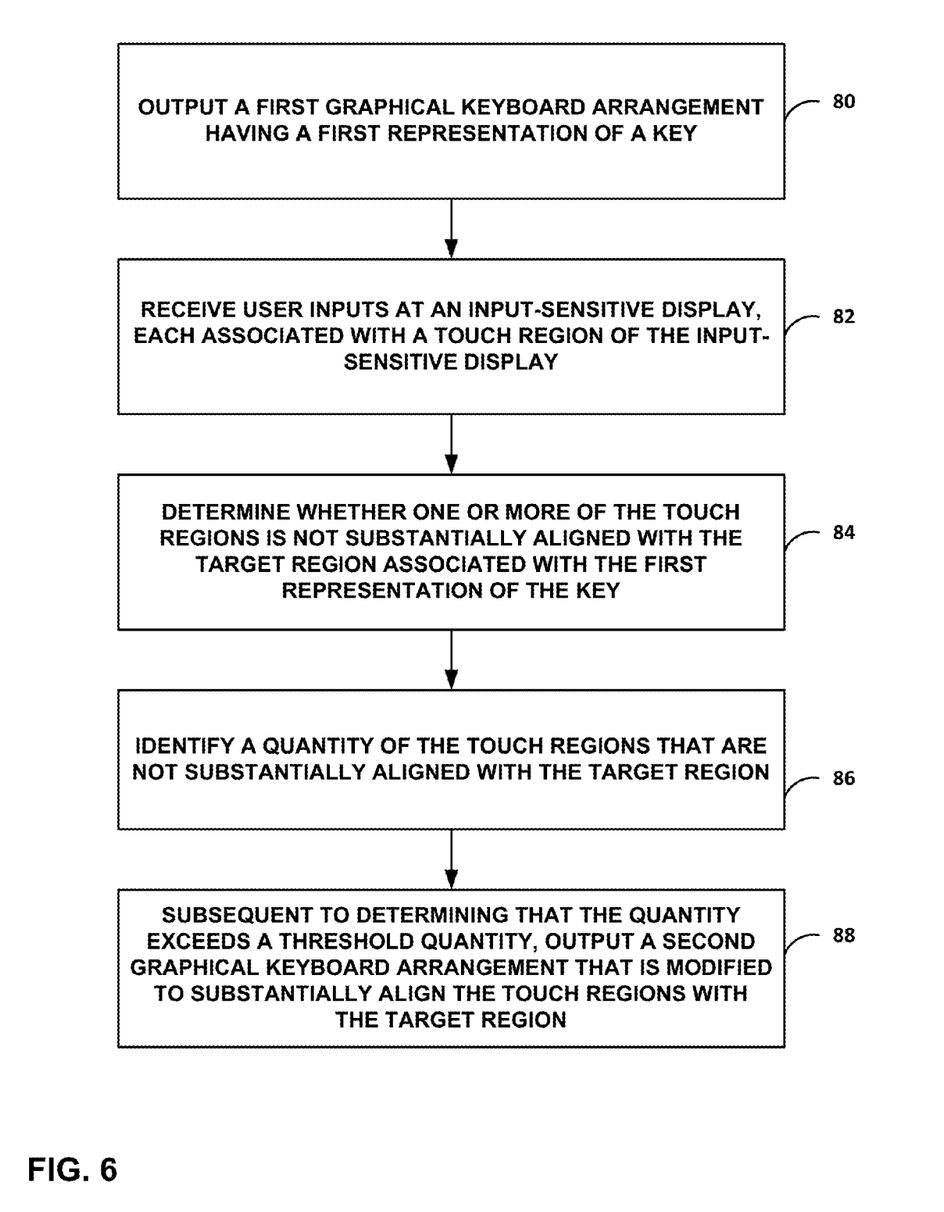
FIG. 6 is a flow diagram illustrating an example operation of a computing device that is configured to execute a keyboard application.

FIG. 6 is a flow diagram illustrating an example process of a computing device or computing system (e.g., computing device 2 of FIGS. 1-2) that is configured to execute a keyboard application. In the example of FIG. 6, a computing device having an input-sensitive display operates by outputting a first graphical keyboard arrangement including a first representation of a key that is associated with a target region of the input-sensitive display (80). The operation includes receiving a plurality of user inputs at the input-sensitive display, each user input from the plurality of user inputs being associated with a respective touch region of the input-sensitive display (82). Responsive to determining that each input from the plurality of user inputs is associated with the first representation of the key, the operation includes determining whether one or more of the associated touch regions is not substantially aligned with the target region associated with the first representation of the key (84). The operation includes identifying a quantity of the touch regions that are not substantially aligned with the target region (86), and, subsequent to determining that the quantity exceeds a threshold quantity of touch regions that are not substantially aligned with the target region, outputting, at the input-sensitive display, a second graphical keyboard arrangement that includes a second representation of the key, wherein at least one attribute of the second representation of the key is graphically modified relative to the first representation of the key so as to substantially align one or more of the touch regions with a target region associated with the second representation of the key (88).

In one example, the process can further include receiving the plurality of user inputs in response to a training program presented by the computing device that prompts a user to type a predefined series of characters using the first graphical keyboard arrangement, and determining that each user input from the plurality of user inputs is associated with the first representation of the key based on a comparison of an order of the user inputs with an order of the predefined series of characters presented by the training program. Alternatively or additionally, the process can include executing a keyboard customization application as a background task of the computing device, and receiving the plurality of user inputs during use by a user of an application executing on the computing device other than the keyboard customization application. In some examples, the process can include determining, for example, that each user input from the plurality of user inputs is associated with the first representation of the key at least in part based on typing corrections received from the user. The process can include outputting, at the input-sensitive display of the computing device, an indication of an option to cease execution of the keyboard customization application as a background task.

Alternatively or additionally, in some examples the process can include outputting, at the input-sensitive display of the computing device, the first graphical keyboard arrangement and the second graphical keyboard at the same time, and soliciting a user selection of one of the first graphical keyboard arrangement and the second graphical keyboard for future use, and/or soliciting a user selection of one or more modifications of attributes of one or more representations of keys of the first graphical keyboard arrangement for future use. The process can include associating the second graphical keyboard arrangement with a profile of a user of the computing device. The process can also include modifying one or more attributes of the second representation of the key to graphically modify relative to the first representation of the key, such as a shape, a size, a position, or other attribute.

In some examples, the process can include determining that one or more of the associated touch regions is not substantially aligned with the target region associated with the first representation of the key based at least on determining that a center of the touch region is positioned greater than a threshold distance away from a center of the target region. In some examples, the process can include determining that one or more of the associated touch regions is not substantially aligned with the target region associated with the first representation of the key based at least on determining that greater than a threshold quantity of surface area of the touch region is positioned outside of the target region.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, of a computing system to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display at an input-sensitive display, a first graphical keyboard arrangement including a first representation of a key, wherein a target region of the input-sensitive display corresponds to the first representation of the key;
receiving, by the computing device data indicative of a plurality of tap gestures received at the input-sensitive display, each respective tap gesture from the plurality of tap gestures detected at a respective location of the input-sensitive display;
determining, by the computing device and based at least in part on one or more of the plurality of tap gestures, that each tap gesture from the plurality of tap gestures corresponds to the key;
responsive to determining that each tap gesture corresponds to the key, identifying, by the computing device, a quantity of the tap gestures detected at locations that are not substantially aligned with the target region corresponding to the first representation of the key; and
responsive to determining that the quantity exceeds a threshold quantity of tap gestures detected at locations that are not substantially aligned with the target region, outputting, by the computing device and for display at the input-sensitive display, a second graphical keyboard arrangement that includes a second representation of the key, wherein at least one attribute of the second representation of the key is graphically modified relative to the first representation of the key so as to substantially align a target region corresponding to the second representation of the key with one or more of the locations at which the tap gestures were detected.

2. The method of claim 1,
wherein the plurality of tap gestures are received at the input-sensitive display in response to a training program presented by the computing device that prompts a user to type a predefined series of characters using the first graphical keyboard arrangement, and
wherein determining that each tap gesture from the plurality of tap gestures corresponds to the key is based at least in part on a comparison of an order of the plurality of tap gestures with an order of the predefined series of characters presented by the training program.

3. The method of claim 1, further comprising:
executing a keyboard customization application as a background task of the computing device, wherein the data indicative of the plurality of tap gestures at the input-sensitive display is received during execution of an application by the computing device other than the keyboard customization application.

4. The method of claim 3, further comprising:
determining, by the keyboard customization application, that each tap gesture from the plurality of tap gestures corresponds to the key at least in part based on typing corrections received from the user.

5. The method of claim 3, further comprising:
outputting, by the computing device and for display at the input-sensitive display, an indication of an option to cease execution of the keyboard customization application as the background task.

6. The method of claim 1, further comprising:
outputting, by the computing device and for display at the input-sensitive display, the first graphical keyboard arrangement and the second graphical keyboard at the same time; and
soliciting a user selection of one of the first graphical keyboard arrangement and the second graphical keyboard for future use.

7. The method of claim 1, further comprising:
outputting, by the computing device and for display at the input-sensitive display, both the first graphical keyboard arrangement and the second graphical keyboard at the same time; and
soliciting a user selection of one or more modifications of attributes of one or more representations of keys of the first graphical keyboard arrangement for future use.

8. The method of claim 1, further comprising:
associating the second graphical keyboard arrangement with a profile of a user of the computing device.

9. The method of claim 1, further comprising:
selecting the at least one attribute of the second representation of the key to graphically modify relative to the first representation of the key, wherein the selected attribute comprises a shape of the second representation of the key.

10. The method of claim 1, further comprising:
selecting the at least one attribute of the second representation of the key to graphically modify relative to the first representation of the key, wherein the selected attribute comprises a size of the second representation of the key.

11. The method of claim 1, further comprising:
selecting the at least one attribute of the second representation of the key to graphically modify relative to the first representation of the key, wherein the selected attribute comprises a position of the second representation of the key in the graphical keyboard.

12. The method of claim 1,
wherein the first graphical keyboard arrangement includes a plurality of representations of a plurality of respective keys,
wherein the second graphical keyboard arrangement comprises a second plurality of representations of respective keys,
wherein the second graphical keyboard arrangement has a different overall size and shape than the first graphical keyboard arrangement, and
wherein the overall size and shape of the second graphical keyboard arrangement is selected so as to substantially align a target region corresponding to the second representation of the key with one or more of the locations at which the tap gestures were detected.

13. The method of claim 1, wherein the input-sensitive display comprises a presence-sensitive display of the computing device that registers each of the plurality of tap gestures at least in part based on presence of an input unit without requiring physical contact between the input unit and the presence-sensitive display.

14. The method of claim 1, wherein the input-sensitive display comprises a touch-sensitive display of the computing device, wherein the plurality of tap gestures comprise a plurality of user touches of the touch-sensitive display.

15. The method of claim 1, further comprising determining that one or more of the tap gestures is detected at a location that is not substantially aligned with the target region corresponding to the first representation of the key based at least in part on determining that a center of the location at which the tap gesture is detected is positioned greater than a threshold distance away from a center of the target region corresponding to the first representation of the key.

16. The method of claim 1, further comprising determining that one or more of the tap gestures is detected at a location that is not substantially aligned with the target region corresponding to the first representation of the key based at least in part on determining that greater than a threshold quantity of surface area of the location at which the tap gesture is detected is positioned outside of the target region corresponding to the first representation of the key.

17. A system comprising:
at least one processor;
a keyboard application operable by the at least one processor to generate graphical keyboard arrangements; and
an input-sensitive display that outputs, for display, a first graphical keyboard arrangement including a first representation of a key, wherein a target region of the input-sensitive display corresponds to the first representation of the key,
wherein the input-sensitive display is configured to receive data indicative of a plurality of respective tap gestures each detected at a respective location of the input-sensitive display, wherein the data indicative of the plurality of tap gestures are received during use by a user of an application executing on the system other than the keyboard application,
wherein the keyboard application determines, based at least in part on one or more of the plurality of tap gestures, that each user input from the plurality of tap gestures corresponds to the key,
wherein the keyboard application, responsive to determining that each tap gesture corresponds to the key, identifies a quantity of tap gestures detected at locations that are not substantially aligned with the target region corresponding to the first representation of the key, and
wherein the input-sensitive display outputs a second graphical keyboard arrangement that includes a second representation of the key, wherein at least one attribute of the second representation of the key is graphically modified relative to the first representation of the key so as to substantially align a target region corresponding to the second representation of the key with one or more of the locations at which the tap gestures were detected.

18. The system of claim 17, wherein the keyboard application generates the second graphical keyboard arrangement responsive to determining that the quantity exceeds a threshold quantity of tap gestures detected at locations that are not substantially aligned with the target region.

19. A non-transitory computer-readable storage medium comprising instructions that, if executed by one or more processors of a computing system, cause the computing system to perform operations comprising:

outputting a first graphical keyboard arrangement for display at an input-sensitive display, the first graphical keyboard arrangement including a first representation of a key, wherein a target region of the input-sensitive display corresponds to the first representation of the key;

receiving data indicative of a plurality of tap gestures, each respective tap gesture from the plurality of tap gestures detected at a respective location of the input-sensitive display;

determining, based at least in part on one or more of the plurality of tap gestures, that each tap gesture from the plurality of tap gestures corresponds to the key;

responsive to determining that each tap gesture corresponds to the key, identifying a quantity of tap gestures detected at locations that are not substantially aligned with the target region corresponding to the first representation of the key; and responsive to determining that one or more of the tap gestures detected at locations is not substantially aligned with the target region associated with the first representation of the key, outputting for display at the input-sensitive display a second graphical keyboard arrangement that includes a second representation of the key, wherein at least one attribute of the second representation of the key is graphically modified relative to the first representation of the key so as to substantially align a target region corresponding to the second representation of the key with one or more of the locations at which the tap gestures were detected.

20. The computer-readable storage medium of claim 19, wherein receiving the data indicative of the plurality of tap gestures comprises receiving data indicative of a plurality of tap gestures received in response to a training program presented by a computing device that prompts a user to type a predefined series of characters using the first graphical keyboard arrangement, wherein determining that each tap gesture from the plurality of tap gestures corresponds to the key comprises determining at least in part based on a comparison of an order of the tap gestures with an order of the predefined series of characters presented by the training program.

21. The method of claim 1, wherein determining that each tap gesture from the plurality of tap gestures corresponds to the key comprising determining that each respective location is located at least partially within the target region corresponding to the first representation of the key.

\* \* \* \* \*